US008371525B2

(12) United States Patent
Haggard

(10) Patent No.: US 8,371,525 B2
(45) Date of Patent: Feb. 12, 2013

(54) AERODYNAMICALLY CONTROLLED GRAPPLE ASSEMBLY

(75) Inventor: Roy A. Haggard, Temecula, CA (US)

(73) Assignee: Hunter Defense Technologies, Inc., Solon, OH (US)

( * ) Notice: Subject to any disclaimer, the term of this patent is extended or adjusted under 35 U.S.C. 154(b) by 113 days.

(21) Appl. No.: 12/761,015

(22) Filed: Apr. 15, 2010

(65) Prior Publication Data

US 2011/0254301 A1    Oct. 20, 2011

(51) Int. Cl.
B64F 1/02    (2006.01)

(52) U.S. Cl. ............... 244/110 F; 244/110 R; 244/1 TD

(58) Field of Classification Search .............. 244/110 R, 244/110 F, 110 C, 1 TD, 135 A, 138 R, 3
See application file for complete search history.

(56) References Cited

U.S. PATENT DOCUMENTS

| 1,842,432 | A | * | 1/1932 | Stanton | 244/63 |
| 3,207,480 | A | * | 9/1965 | Fulton, Jr. | 258/1.2 |
| 4,152,019 | A | * | 5/1979 | Jarman et al. | 294/112 |
| 4,523,729 | A | * | 6/1985 | Frick | 244/115 |
| 4,884,769 | A | * | 12/1989 | Snead | 244/145 |
| 6,418,989 | B1 | * | 7/2002 | Jarman | 144/336 |
| 6,824,102 | B2 | * | 11/2004 | Haggard | 244/110 F |
| 7,059,564 | B2 | | 6/2006 | Dennis | |
| 7,097,137 | B2 | | 8/2006 | McDonnell | |
| 7,143,976 | B2 | * | 12/2006 | Snediker et al. | 244/110 G |
| 7,510,145 | B2 | | 3/2009 | Snediker | |
| 2006/0180706 | A1 | | 8/2006 | Antonenko et al. | |
| 2008/0156932 | A1 | | 7/2008 | McGeer et al. | |
| 2008/0191091 | A1 | | 8/2008 | Hoisington et al. | |
| 2009/0294584 | A1 | * | 12/2009 | Lovell et al. | 244/110 F |
| 2011/0006151 | A1 | * | 1/2011 | Beard | 244/3 |

FOREIGN PATENT DOCUMENTS

DE    34 01 825    8/1984

OTHER PUBLICATIONS

Gravlee et al., "Partial Rocket Reuse Using Mid-Air Recovery", AIAA Space 2008 Conference & Exposition, Sep. 9-11, 2008, San Diego, California, pp. 1-11.
Brown et al., "Parafoil Mid-Air Retrieval For Space Sample Return Missions", 16th AIAA Aerodynamic Decelerator Systems Technology Conference and Seminar, May 21-24, 2001, Boston, Massachusetts, Cover page and pp. 1-8.
Haggard, "Progress Update Report 3rd Generation Mid-Air Retreival", Vertigo ULA Progress Update, pp. 1-23, Apr. 28, 2008.

* cited by examiner

*Primary Examiner* — Philip J Bonzell
(74) *Attorney, Agent, or Firm* — Fay Sharpe LLP

(57) ABSTRACT

An aerodynamically controlled grapple assembly includes a frame member secured to an associated load line and a streamlined body mounted to the frame member. The streamlined body includes a main lifting surface extending away from the body in a first direction and a vertical stabilizer extending away from the body in a second direction. A pair of grapple arms are movably connected to the frame member.

19 Claims, 6 Drawing Sheets

AERODYNAMICALLY CONTROLLED GRAPPLE ASSEMBLY

BACKGROUND

The present disclosure relates to midair retrieval technology. More specifically, it relates to an aerodynamically controlled grapple assembly (hereafter sometimes referred to as the Aero-Grapple) which can be employed during midair retrieval operations.

Midair retrieval is a technique used to capture an object while it is still airborne. The object to be retrieved is slowed by means of one or more parachutes, and a specially equipped aircraft, more particularly a helicopter, matches the object's trajectory and catches it in midair. Successful midair retrieval techniques require favorable atmospheric conditions, a successful execution of maneuvers to bring a grappling hook mounted beneath the retrieving helicopter into the correct position, and the correct operation of the retrieval helicopter itself. Helicopters are the optimal aircraft for these operations, due to their Vertical Takeoff and Landing (VTOL) capability.

It has been determined that for midair retrieval, the use of a parafoil is advantageous in comparison to a parachute, in order to more easily engage the object to be retrieved. A parafoil has numerous advantages over a non-gliding "round" parachute, all of which contribute to a far greater margin of safety as compared with legacy midair retrieval techniques. The forward glide of a parafoil enables a helicopter to approach and engage the object to be retrieved with a lower separation velocity than is possible with a round parachute. A parafoil does not have a large low-pressure area above it. This allows the helicopter to fly directly over the parafoil without fear of an uncommanded descent into the parafoil. If maneuvering to the same proximity were attempted over a round parachute, the helicopter would experience a rapid onset of "settling with power" as a result of hovering in the entrained down-flow present above the round parachute, likely causing a midair collision with the round parachute. In addition, a parafoil generates a lower rate of descent for a given weight and provides a better sight picture for the retrieving pilot.

The state of the art in midair retrieval is exemplified by U.S. Pat. No. 6,824,102 dated Nov. 30, 2004. The subject matter of that patent is incorporated herein by reference in its entirety. One problem with the known midair retrieval system is that the hook or grapple currently employed is not aerodynamically configured. Therefore, it cannot be controlled. Various forms of hooks and grapples are known, including latching and remotely activated types. However, the known grapple which is suspended below a helicopter will swing in an uncontrolled pendular motion. This motion can be damped through aggressive precision control inputs by the pilot of the capture helicopter, but it greatly increases the time required to capture a parafoil-borne payload.

Control of the Aero-Grapple by a trained flight crew member residing in the retrieval helicopter would be advantageous in order to allow the retrieval helicopter to more easily capture payloads carried by a descending parafoil, parachute, or the like. It would be desirable to improve the safety and reliability of an in-flight grapple engagement. To this end, it would be desirable to utilize lifting surfaces with aerodynamic controls integrated with the remote grapple mechanism in order to control the position of the Aero-Grapple independent of helicopter motion.

Accordingly, it has been considered desirable to develop a new and improved aerodynamic retrieval assembly, or Aero-Grapple, which meets the above stated needs and overcomes the foregoing difficulties as well as others, while providing better and more advantageous overall results.

SUMMARY OF THE DISCLOSURE

According to one embodiment of the present disclosure, an aerodynamically controlled grapple assembly secured as an external load from an associated flying vehicle is provided. The grapple assembly comprises a frame member secured to an associated load line suspended from the associated vehicle and a streamlined body mounted to the frame member and encasing at least a portion of the frame member. The body comprises a vertical member and, spaced therefrom, a vertical stabilizer to help orient the body in flight. A grapple mechanism is mounted to the frame member in spaced relation to the vertical member.

According to another embodiment of the present disclosure, an aerodynamically controlled grapple assembly is provided. In this embodiment, the aerodynamically controlled grapple assembly comprises a frame member secured to an associated load line and a streamlined body mounted to the frame member. The streamlined body comprises a main lifting surface extending away from the body in a first direction and a tail extending away from the body in a second direction. A pair of grapple arms are movably connected to the frame member.

According to a further embodiment of the present disclosure, an aerodynamically controlled grapple assembly is provided. In accordance with this embodiment of the disclosure, the aerodynamically controlled grapple assembly comprises a frame member secured to an associated load line and a streamlined body mounted to the frame member. The streamlined body comprises a vertical member extending from the body and a vertical stabilizer extending from the body in a spaced manner from the vertical member. First and second control surfaces are mounted to the vertical member and a third control surface is mounted to the vertical stabilizer. A grapple mechanism is mounted to the frame member along with a mechanism for actuating the grapple mechanism. Means, supported by the frame member, are provided for activating the first, second and third control surfaces. The means are controlled remotely by wireless command.

BRIEF DESCRIPTION OF THE DRAWINGS

The invention may take form in various components and arrangements of components. The drawings are for purposes of illustrating a preferred embodiment of the disclosure and are not to be construed as limiting same. In the drawings.

DETAILED DESCRIPTION OF THE PREFERRED EMBODIMENTS

Figure 1:
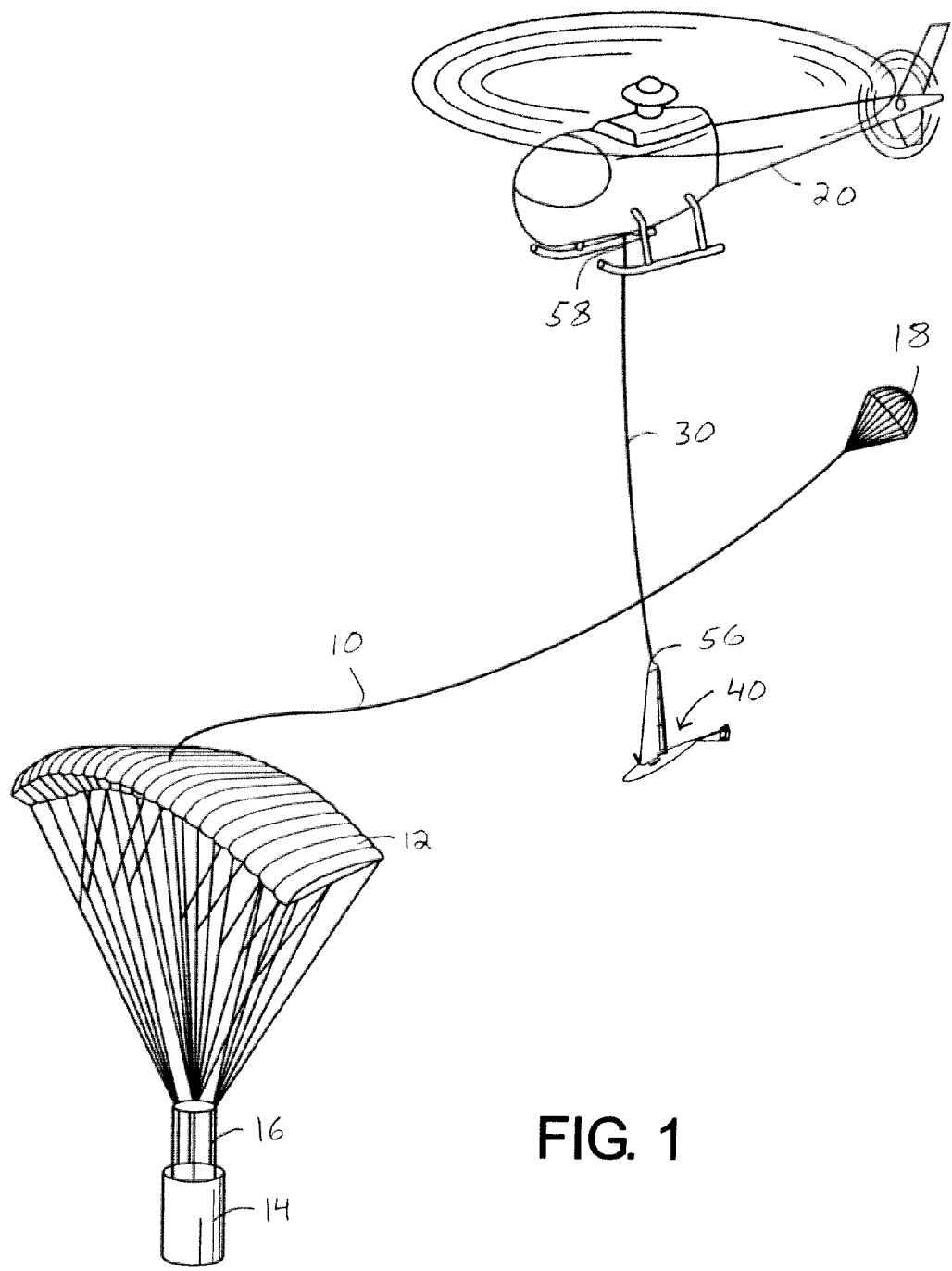
FIG. 1 is a perspective view illustrating the capture of a descending payload, suspended from a parafoil, by an aerodynamically controlled grapple assembly supported from an aircraft, according to one embodiment of the present disclosure.

Referring now to the Figures, wherein the showings are for purposes of illustrating a preferred embodiment of the present disclosure only, and not for purposes of limiting same, FIG. 1 illustrates a retrieval line 10 trailing from a parafoil canopy 12 that is carrying a payload 14 via payload risers 16. A drogue parachute 18 can be attached to the line 10 to accentuate the line's rearward streaming, making it a more stabilized and visible target. The drogue also contains a physical stopper that secures the payload when the stopper comes in contact with the closed grapple arm during the midair retrieval. An aircraft 20, such as a helicopter, employs a load line 30 supporting a aerodynamically controlled grapple assembly (hereafter sometimes referred to as the Aero-Grapple) 40 to retrieve the payload 14. After the Aero-Grapple 40 captures the retrieval line 10, the helicopter 20 ascends while moving forward, until it is directly above the parafoil 12, and then very slowly ascends until the payload weight is transferred from the parafoil to the helicopter 20 via the load line 10. The Aero-Grapple 40 is designed so that it can be more easily controlled by the Aero-Grapple operator in the helicopter.

Figure 1A:
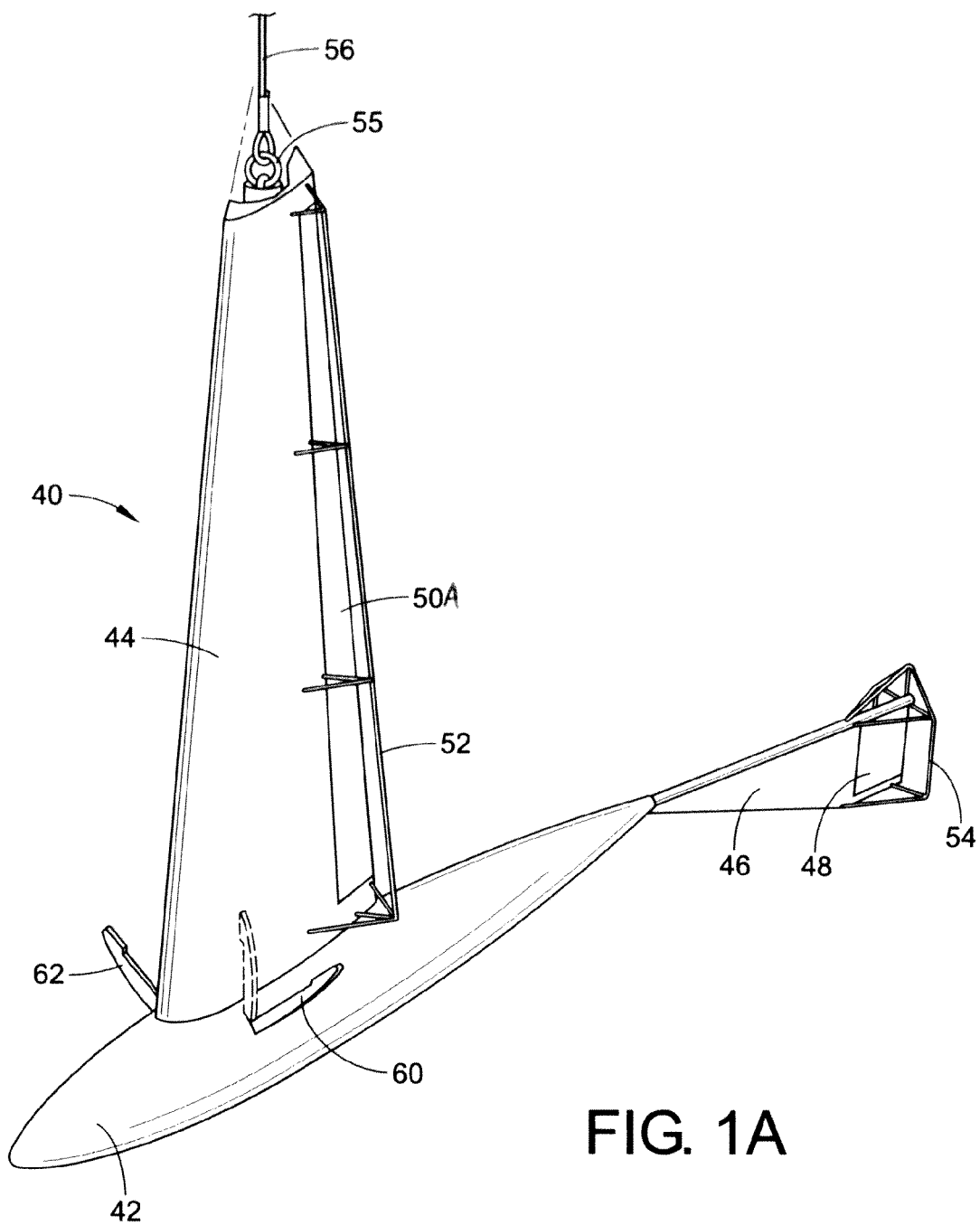
FIG. 1A is an enlarged perspective view of the aerodynamically controlled grapple assembly illustrated in FIG. 1.
Figure 1B:
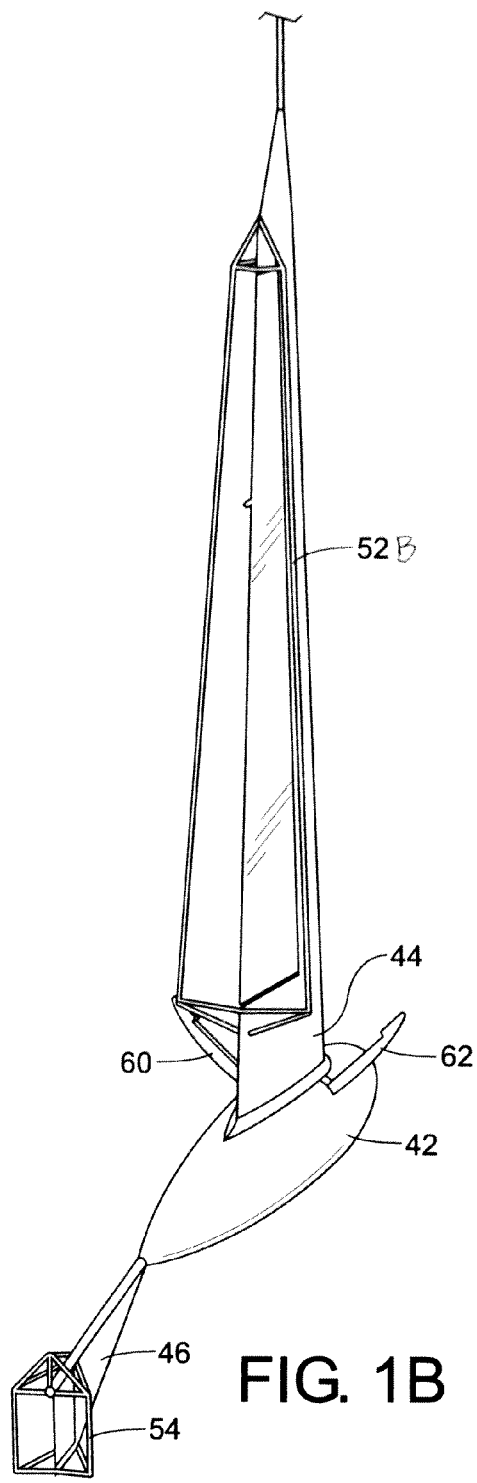
FIG. 1B is a reduced rear perspective view of the aerodynamically controlled grapple assembly illustrated in FIG. 1A.
Figure 1C:
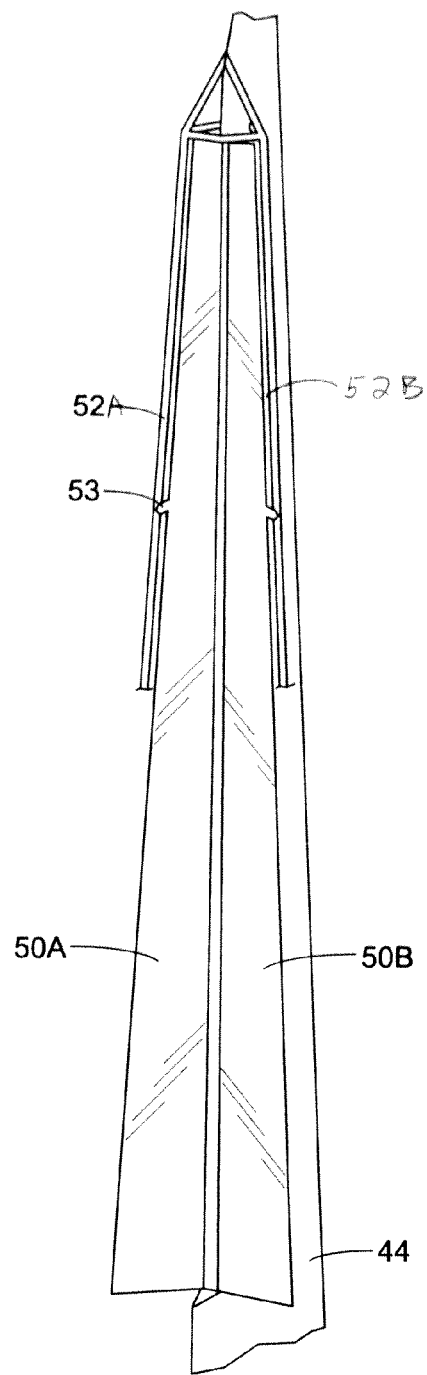
FIG. 1C is an enlarged perspective view of a portion of the aerodynamically controlled grapple assembly of FIG. 1B.
Figures 2, 3:
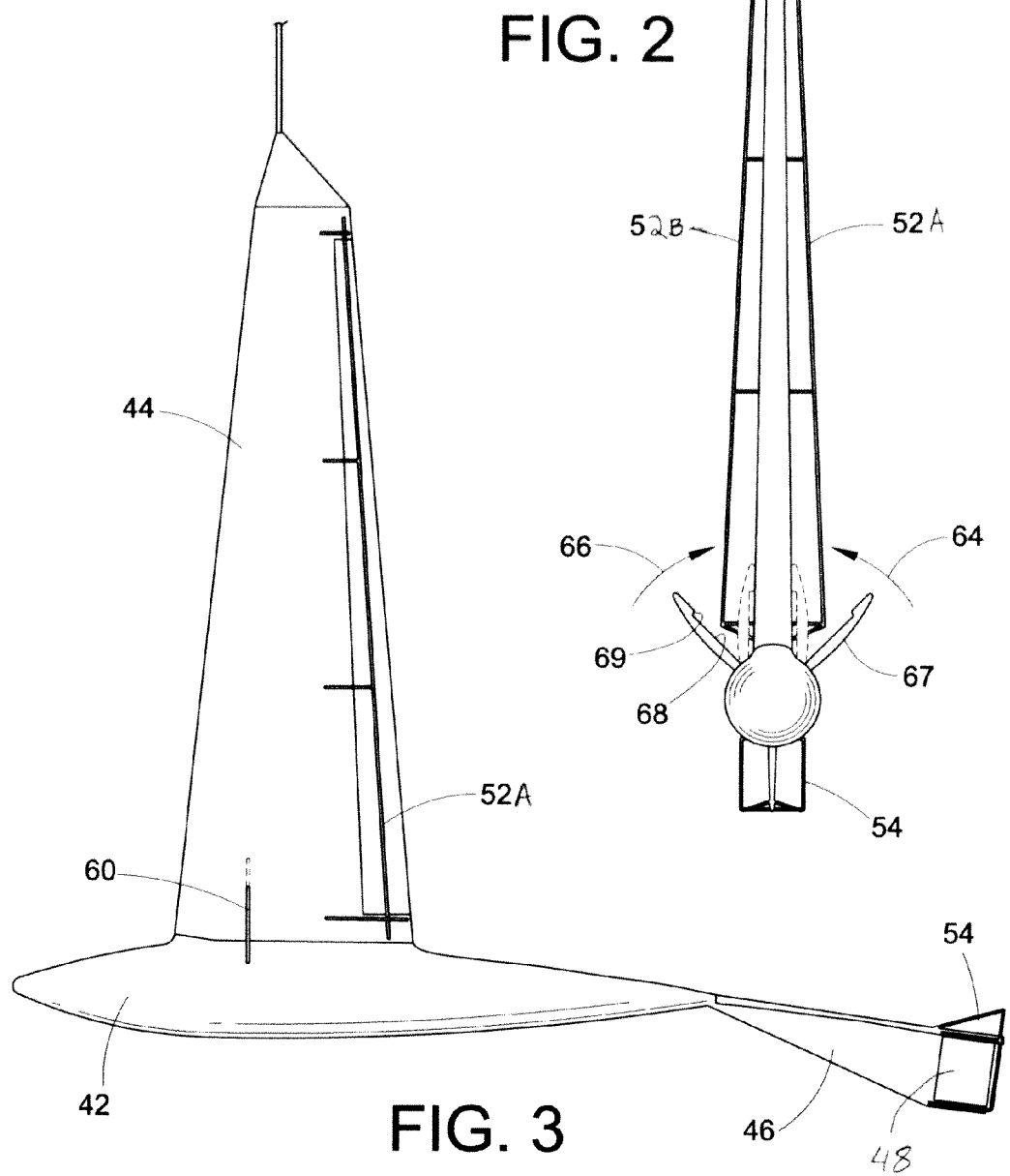
FIG. 2 is an enlarged front elevational view of the aerodynamically controlled grapple assembly of FIG. 1.
FIG. 3 is a side elevational view of the aerodynamically controlled grapple assembly of FIG. 2.

With reference now to FIG. 1A, the Aero-Grapple 40 is comprised of a main grapple body 42 which is aerodynamically shaped or torpedo-shaped or cigar-shaped, and could be termed a nacelle, as is evident from FIGS. 1B, 2 and 3. Thus, the body 42 has rounded surfaces to decrease air resistance. Extending upwardly from the main grapple body 42 is a vertical member or lifting surface 44. Extending aft from the main grapple body 42 is a vertical stabilizer or tail 46 to stabilize and control the heading of the Aero-Grapple when in forward motion. The tail includes a control surface 48 (FIG. 3). Similarly, the vertical member 44 includes control surfaces 50A and 50B (FIG. 10) that are deployed appropriately to produce both lift and drag. These can be termed split flaps. As is known, such flaps can be separated from each other into a deployed orientation, as shown in FIG. 10, or brought together into an aligned condition or stowed orientation, as shown in FIG. 1B. Each flap can be separately actuated as will be discussed below, and can be displaced by about 10-15° from its stored position to its deployed position. Positioned at the upper end of the vertical member 44 is an eye 55 (FIG. 1A) through which a lower end or second end 56 of the load line 30 can be secured. As shown in FIG. 1, an upper end or first end 58 of the load line 30 is secured to the helicopter 20, such as to an external load hook 59 (FIG. 5) of the helicopter.

Positioned on either side of the control surfaces 50A, 50B are wire guards 52A and 52B (FIG. 10). The wire guards form cages around the control surfaces 50A, 50B in order to prevent the load line 30 from becoming entangled with the control surfaces 50A, 50B during the time when the flying vehicle 20 lifts the grapple 40 from the ground. If desired, tabs 53 can be provided on the control surfaces 50A and 50B. These tabs serve to limit the deployed orientation of the split flaps. More particularly, when a tab 53 contacts the adjacent wire guard, it prevents the flap from rotating further away from its stowed orientation. In other words, it serves as a limit for the flaps deployed orientation. Of course, it should be recognized that such a means for limiting the deployed orientation of the split flaps may not be necessary in all circumstances. Moreover, the means can take a variety of other known forms as well.

The wire guards or cages also prevent the retrieval line 10 of the parafoil from getting hung up on or in a nook or cranny defined by the vertical member 44 and the control surfaces 50A, 50B during the process of retrieving or capturing a payload. The wire guards or wire cages can be made of, for example, one-eighth inch diameter wire. It should be recognized that any suitable diameter of wire or shape of construction can be employed as well. It should also be appreciated that other known shielding means for preventing hang up of the retrieval line 10 or the load line 30 with the vertical stabilizer 44 and the control surface 50 could be employed as may be desired. A similar guard assembly 54 (FIG. 1B) can be provided for the control surface 48 on the vertical stabilizer or tail 46, if so desired.

Located on the main grapple body 42 is a pair of grapple arms 60 and 62. The grapple arms are articulated so they can be moved from a deployed orientation (shown in solid lines in FIG. 2) to a retracted orientation of the grapple arms (shown in dashed lines), as illustrated by arrows 64 and 66. The grapple arms are first positioned in the deployed orientation and are retracted either by the grapple operator or when the retrieval line 10 is identified by a sensor 65 (FIG. 5) installed in the grapple mechanism that it is in position to be captured. With reference now particularly to FIGS. 1B and 2, it can be seen that the grapple arms 60 and 62 include planar lower surfaces 67 and generally planar upper surfaces 68, but which each include an enlarged portion 69. The retrieval line 10 is meant to be accommodated in the indented portion defined in each of one of the grapple arms, trapped between surface 68 of the arm and the lifting surface 44 when the grapple arm is actuated to move to the retracted orientation.

Figure 4:
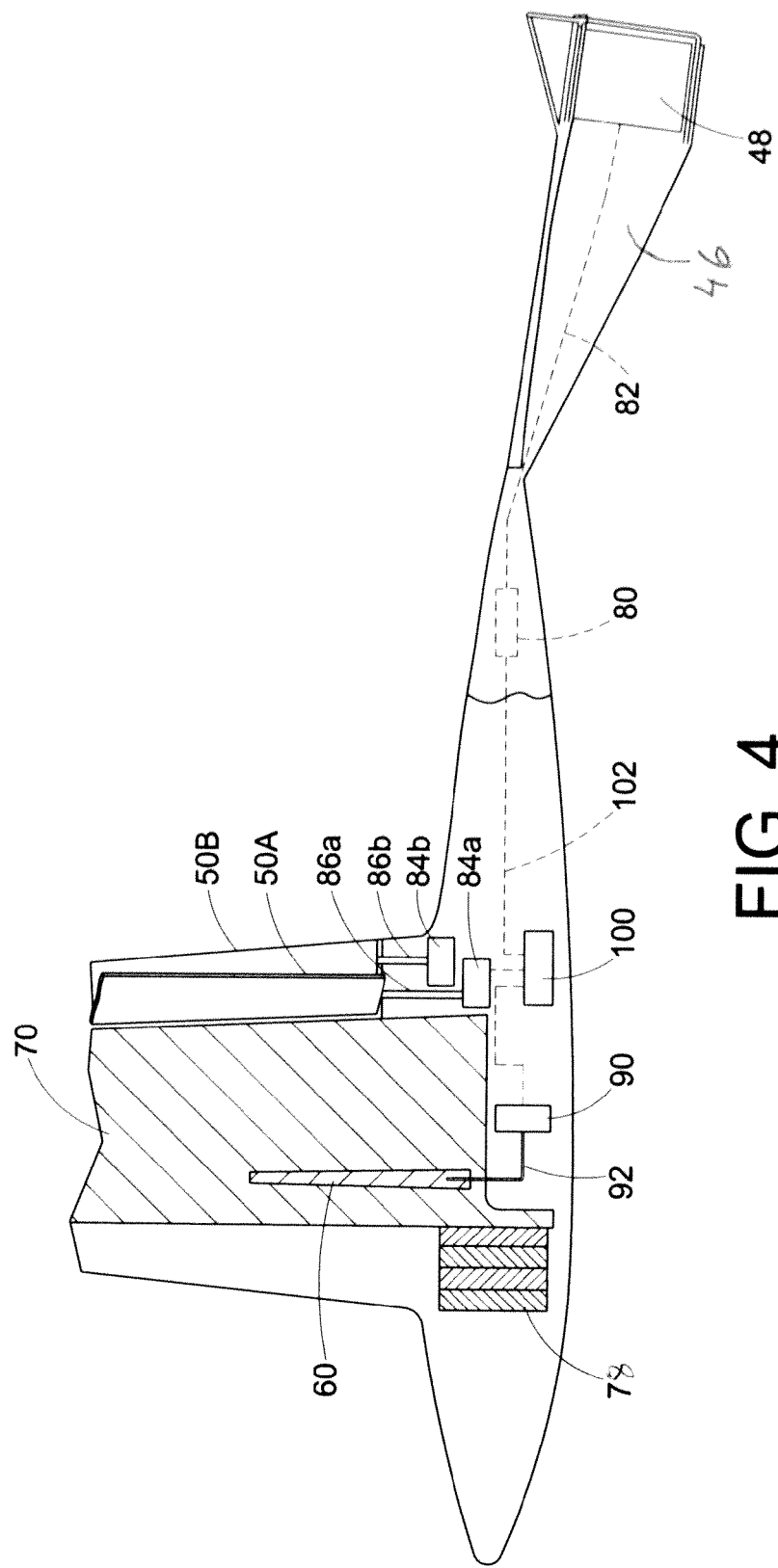
FIG. 4 is a schematic cross sectional view of a portion of the aerodynamically controlled grapple assembly of FIG. 2; and, FIG. 5 is a schematic perspective view of a frame of the aerodynamically controlled grapple assembly without an aerodynamic body or shell mounted thereto.
Figure 5:
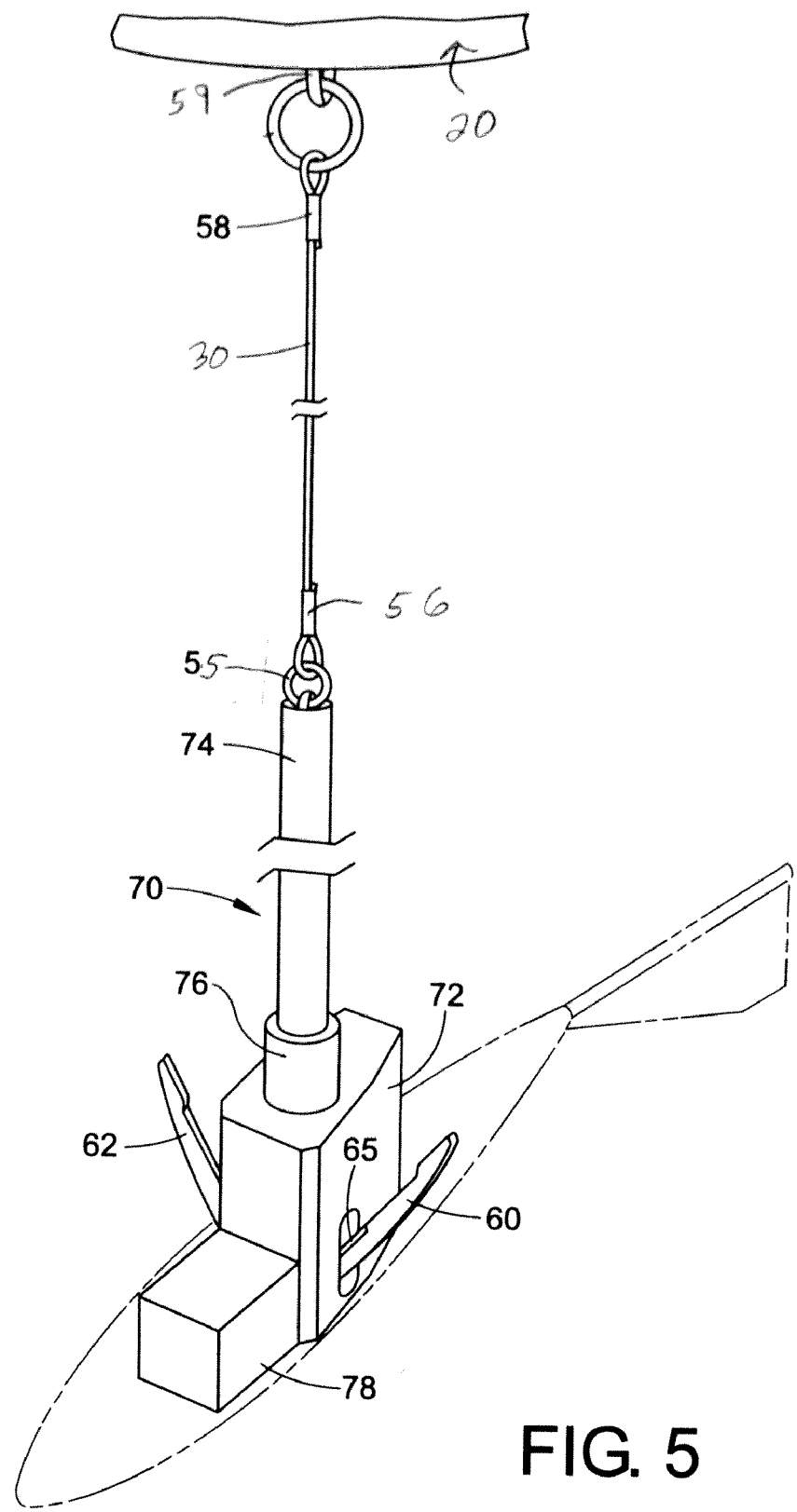

With reference now to FIGS. 4 and 5, the Aero-Grapple includes a structural frame or strength member 70 which supports both the main grapple body 42, and the vertical lifting surface 44. While a particular design of a structural frame 70 is illustrated in the embodiment of FIG. 5, it should be appreciated that any suitable frame design can be employed, depending on the precise shape of the Aero-Grapple 40 and the weight of the payload which is meant to be retrieved by the Aero-Grapple. In the embodiment illustrated in FIG. 5, the structural frame 70 comprises a lower portion 72 which can be approximately rectangular in shape and a tubular portion 74 extending upwardly from the rectangular portion 72. It should be appreciated that the tubular portion 74 can be housed in the main lifting surface 44. The somewhat rectangular portion 72 can be housed in both the aero body 42, as well as the main lifting surface 44, as is apparent from FIG. 4. If desired, a somewhat larger diameter tubular section 76 can be provided at the intersection of the tubular member 74 and the rectangular member 72. In the embodiment shown, the upper end of the structural frame 70, more particularly, the tubular member 74, terminates in the eye 55.

Housed in the main grapple body 42 can be one or more ballast plates or weights 78. In the embodiment illustrated, the ballast plates 78 are secured to the lower portion 72 of the structural frame 70. The number of ballast plates 78 can be varied according to the intended airspeed and desired flight dynamics of the Aero-Grapple in order to obtain the desired fore-aft grapple position in flight. Thus, the ballast plates are optional. It should be appreciated that the aero body 42 and the main lifting surface 44 are mounted to, and supported by, the structural frame 70. If damage occurs to the aero body 42, the main lifting surface 44 or the vertical stabilizer 46 during retrieval of a load, one or more of these items can be replaced as needed. In other words, the aero body and its associated components serve as a shell around the structural frame 70. They provide the streamlined shape and control surfaces which are necessary in order to more accurately control the movement of the aerodynamic grapple assembly according to the present disclosure.

As is evident from FIG. 4, in the illustrated embodiment, a servo actuator 80 moves the control surface 48 on the vertical stabilizer or tail 48 via a shaft or linkage 82. Similarly, servo actuators 84a and 84b move the control surfaces 50A and 50B via shafts or linkages 86a and 86b. The grapple arms 60 and 62 are moved via a hook actuator 90 via one or more link members 92. As will be appreciated, the hook 62 is not visible in FIG. 4. Controlling all of the servo actuators and the hook actuator is a helicopter crew member who is a trained Aero-Grapple system operator. Such control can be accomplished remotely by wireless command via radio signals or other electronic signals. To this end, a receiver-decoder 100 is provided in the main grapple body 42. The receiver-decoder communicates with the various actuators via suitable electrical lines, such as at 102.

The servo actuators actively control the angular deflection of the control surfaces or split flaps 50A and 50B, as well as control surface 48. In this way, the position of the Aero-Grapple can be changed in order to suit the task of retrieving the payload 14 (FIG. 1). It should be appreciated that the split flaps can be individually controlled as many be necessary. That is the reason why separate actuators and linkages are provided, one for each of the flaps. The grapple actuator 90 moves the grapple arms 60 and 62 from the open to the closed position, or vice versa, via linkage 92.

It should be appreciated that the dynamic and aerodynamic requirements for stabilizing and controlling a non-lifting, towed body are fundamentally different from those which pertain to airplanes. In airplanes, a lifting action of the airplane's wings is vertical. In contrast, for the Aero-Grapple illustrated in the embodiment of FIGS. 1-5, lift forces are used to control the Aero-Grapple's lateral position. Hence, the vertical stabilizer or tail 46 is used for directional control, and the vertical lifting surface 44 produces lift in the horizontal direction in order to control the lateral position of the Aero-Grapple.

One embodiment of an Aero-Grapple according to the present disclosure has been provided. In this embodiment, the Aero-Grapple is comprised of a structural framework covered by an aerodynamic body. The body is comprised of a vertical wing used to create lateral lift forces and a vertical stabilizer or tail, which is used to control the direction of flight. The vertical wing or main lifting surface extends vertically upward from the body and the vertical stabilizer or tail extends downward below the body, spaced aft from the lifting surface. Two control surfaces, the split flaps, are mounted to the main lifting surface. The vertical stabilizer has the third control surface mounted to it. A grapple mechanism is held by the body and provides for the opening and closing of the grapple arms. A means to activate the first, second and third control surfaces is located in the body. The means are activated remotely by wireless command.

It should also be appreciated that the Aero-Grapple disclosed herein is useful for a number of purposes, not just for midair retrieval with aircraft such as helicopters, engaging objects such as parafoils or parachutes. The subject matter of the disclosure herein can be employed more generally for connecting any two vehicles in flight. For example, the aerodynamic body according to the instant disclosure can be employed even without the aerodynamically controlled grapple assembly so that it could be adapted for use more generally in connecting any two vehicles in flight. To this end, the first vehicle can tow the aerodynamic body and the second vehicle can be provided with suitable means for capturing the aerodynamic body thereby allowing the first and second vehicles to be connected in flight. Such connection of the vehicles may be useful for refueling, or other purposes. In addition, a connection assembly other than the hooks illustrated in FIGS. 1A-5 can be provided on the aerodynamic body and employed to connect the first vehicle to another object in the air, when so desired.

The disclosure has been described with reference to a preferred embodiment. Obviously, modifications and alterations will occur to others upon a reading and understanding of the preceding specification. It is intended that the invention be construed as including all such modifications and alterations insofar as they come within the scope of the appended claims or the equivalents thereof.

What is claimed is:

1. An aerodynamically controlled grapple assembly comprising:
    a frame member secured to an associated load line;
    a streamlined body mounted to said frame member, said streamlined body comprising:
        a vertical lifting surface extending upwards from said body,
        a vertical stabilizer extending from said body in a spaced manner from said vertical lifting surface,
        a first control surface mounted to said vertical lifting surface,
        a second control surface mounted to said vertical lifting surface, and
        a third control surface mounted to said vertical stabilizer;
    a grapple mechanism mounted to said frame member, along with a mechanism for actuating said grapple mechanism; and
    a mechanism, supported by said frame member, for actuating said first, second and third control surfaces.

2. The aerodynamically controlled grapple assembly of claim 1 wherein said streamlined body encloses said frame member, except for a pair of grapples of said grapple mechanism.

3. The aerodynamically controlled grapple assembly of claim 1 wherein said streamlined body further comprises a main lifting surface.

4. The aerodynamically controlled grapple assembly of claim 1 wherein said grapple mechanism is spaced from said vertical stabilizer.

5. The aerodynamically controlled grapple assembly of claim 1 further comprising a support mounted to the frame member via which the frame member can be suspended from an associated load line.

6. The aerodynamically controlled grapple assembly of claim 1 further comprising a first guard protecting said first and second control surfaces.

7. The aerodynamically controlled grapple assembly of claim 1 further comprising a second guard protecting said third control surface.

8. The aerodynamically controlled grapple assembly of claim 1 wherein said mechanism for actuating said first, second and third control surfaces comprises first and second actuators for controlling a movement of a respective one of said first and second control surfaces.

9. The aerodynamically controlled grapple assembly of claim 8 wherein said mechanism for actuating said first, second and third control surfaces further comprises a third actuator for controlling a movement of said third control surface.

10. The aerodynamically controlled grapple assembly of claim 8 wherein said first and second actuators are individually controlled.

11. The aerodynamically controlled grapple assembly of claim 1 wherein said body includes a longitudinal axis and said vertical stabilizer is spaced along said longitudinal axis from said vertical liftinq surface.

12. The aerodynamically controlled grapple assembly of claim 11 further including a ballast weight which is mounted to said frame member.

13. The aerodynamically controlled grapple assembly of claim 12 wherein said streamlined body encloses said ballast weight.

14. The aerodynamically controlled grapple assembly of claim 1 wherein said mechanism for actuating said grapple mechanism comprises an actuator and a link member connecting said actuator to said grapple mechanism.

15. The aerodynamically controlled grapple assembly of claim 14 in which said mechanism for actuating said first, second and third control surfaces is activated remotely by wireless command.

16. The aerodynamically controlled grapple assembly of claim 1 wherein said grapple mechanism comprises a pair of grapple arms.

17. The aerodynamically controlled grapple assembly of claim 16 wherein said mechanism for actuating said grapple mechanism comprises an opening and closing actuator.

18. The aerodynamically controlled grapple assembly of claim 1 wherein said first and second control surfaces deploy in opposite directions.

19. The aerodynamically controlled grapple assembly of claim 18 wherein said first and second control surfaces are aligned in one orientation.

* * * * *